United States Patent
Montenegro et al.

(10) Patent No.: US 8,000,069 B2
(45) Date of Patent: Aug. 16, 2011

(54) CIRCUIT TESTING CLOSER APPARATUS AND METHOD WITH DYNAMIC TEST THRESHOLDS

(75) Inventors: Alejandro Montenegro, Chicago, IL (US); Raymond P. O'Leary, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 155 days.

(21) Appl. No.: 12/469,179

(22) Filed: May 20, 2009

(65) Prior Publication Data

US 2010/0296215 A1   Nov. 25, 2010

Related U.S. Application Data

(60) Provisional application No. 61/054,781, filed on May 20, 2008.

(51) Int. Cl.
*H02H 3/00* (2006.01)
(52) U.S. Cl. .......................................... 361/71; 361/72
(58) Field of Classification Search .............. 361/62–69, 361/71, 72, 75
See application file for complete search history.

(56) References Cited

U.S. PATENT DOCUMENTS

| | | | |
|---|---|---|---|
| 3,462,646 A | 8/1969 | Bell | |
| 3,558,983 A | 1/1971 | Steen | |
| 4,724,391 A | 2/1988 | Blahous | |
| 6,667,866 B1 | 12/2003 | LaPlace et al. | |
| 6,718,271 B1 | 4/2004 | Tobin | |
| 6,735,534 B2 | 5/2004 | McClure | |
| 2001/0034568 A1 | 10/2001 | Egolf et al. | |
| 2008/0266733 A1* | 10/2008 | O'Leary et al. | 361/71 |

FOREIGN PATENT DOCUMENTS

| | | |
|---|---|---|
| EP | 1580859 A1 | 9/2005 |
| GB | 252134 A1 | 11/1926 |
| GB | 2303005 A1 | 5/1997 |

OTHER PUBLICATIONS

Qiang, et al. A New Adaptive Autoreclosure Scheme to Distinguish Transient Faults from Permanent Faults, Power System Technology Proceedings, Oct. 13, 2002, vol. 2, pp. 671-674.
PCT International Search Report and Written Opinion of International Searching Authority in co-pending PCT/US2009/044588.

* cited by examiner

*Primary Examiner* — Danny Nguyen

(57) ABSTRACT

A circuit testing closer is capable of closing a power distribution circuit and interrupting the resulting current at the next current zero. Upon detecting a fault, the circuit testing closer is operable to open contacts to isolate the fault. Next, the circuit testing closer tests the faulted line to determine whether the fault has cleared. The circuit testing closer may employ one or more dynamic thresholds to determine the existence of a fault.

18 Claims, 12 Drawing Sheets

CIRCUIT TESTING CLOSER APPARATUS AND METHOD WITH DYNAMIC TEST THRESHOLDS

CROSS-REFERENCE TO RELATED APPLICATIONS

This patent claims priority benefit from U.S. Provisional Patent Application Ser. No. 61/054,781 filed May 20, 2008, the disclosure of which is hereby expressly incorporated herein by reference for all purposes.

TECHNICAL FIELD

This patent relates to apparatus and methods providing a circuit testing function prior to circuit closing.

BACKGROUND

Circuit interrupting and reclosing devices function to isolate a fault condition in a power distribution system and upon clearing of the fault condition to reclose the circuit. Faults in a power distribution system can occur for any number of reasons and are typically transient. Detection and isolation of the fault mitigates damage to the system as a result of the fault. Automatic reclosing of the circuit following a fault returns the power distribution system to normal operation quickly and without operator intervention.

Recloser devices may be designed to operate after a fault interruption to reclose the faulted line or lines. Following reclosing, if the fault is not cleared the recloser device will detect the fault and again operate to open and isolate the fault. This process of closing, fault sensing and reopening may occur several times before it is determined that the fault is persistent, i.e., is a fault requiring some reparative intervention, and the recloser locks out to isolate the fault.

The process of reclosing into a fault, however, may have the detrimental effect of repeatedly subjecting the power distribution circuit and any connected loads to the fault current and other potentially damaging current anomalies. Given the close, sense, reopen operating nature of the recloser device, this may occur several times before the fault is cleared or the recloser is locked out.

DETAILED DESCRIPTION

A circuit testing closer is capable of closing a medium-voltage (MV) power distribution circuit and interrupting the resulting current at the next current zero. The circuit testing closer has current and voltage measurements at its disposal, either as integral sensing elements or as provided by external sensing elements. Upon detecting a line fault, the circuit testing closer is operable to open contacts to isolate the fault. Next, the circuit testing closer tests the faulted line to determine whether the fault has cleared. If the fault has cleared, the circuit testing closer recloses the line restoring service. Closing may be accomplished in a manner to minimize current anomalies. If the fault is persistent, after the testing protocol is completed, the closer is locked out, isolating the fault until repairs can be made.

A circuit testing closer in accordance with one or more of the herein described embodiments may incorporate a controller and a machine readable media containing an operating program, or may appropriately be linked to a controller including a machine readable media containing an operating program, for example, by wireless communication. The controller allows the circuit testing closer following fault isolation to systematically test the power distribution circuit before reclosing. Systematic testing may include a sequence of brief closings generating test current pulses that may be evaluated to determine the fault state of the line. Furthermore, the controller may coordinate the pulse timing and subsequent line reclosing to reduce the possibility of current anomalies and to ensure quenching of the arc resulting from the test current loop.

Figure 1:
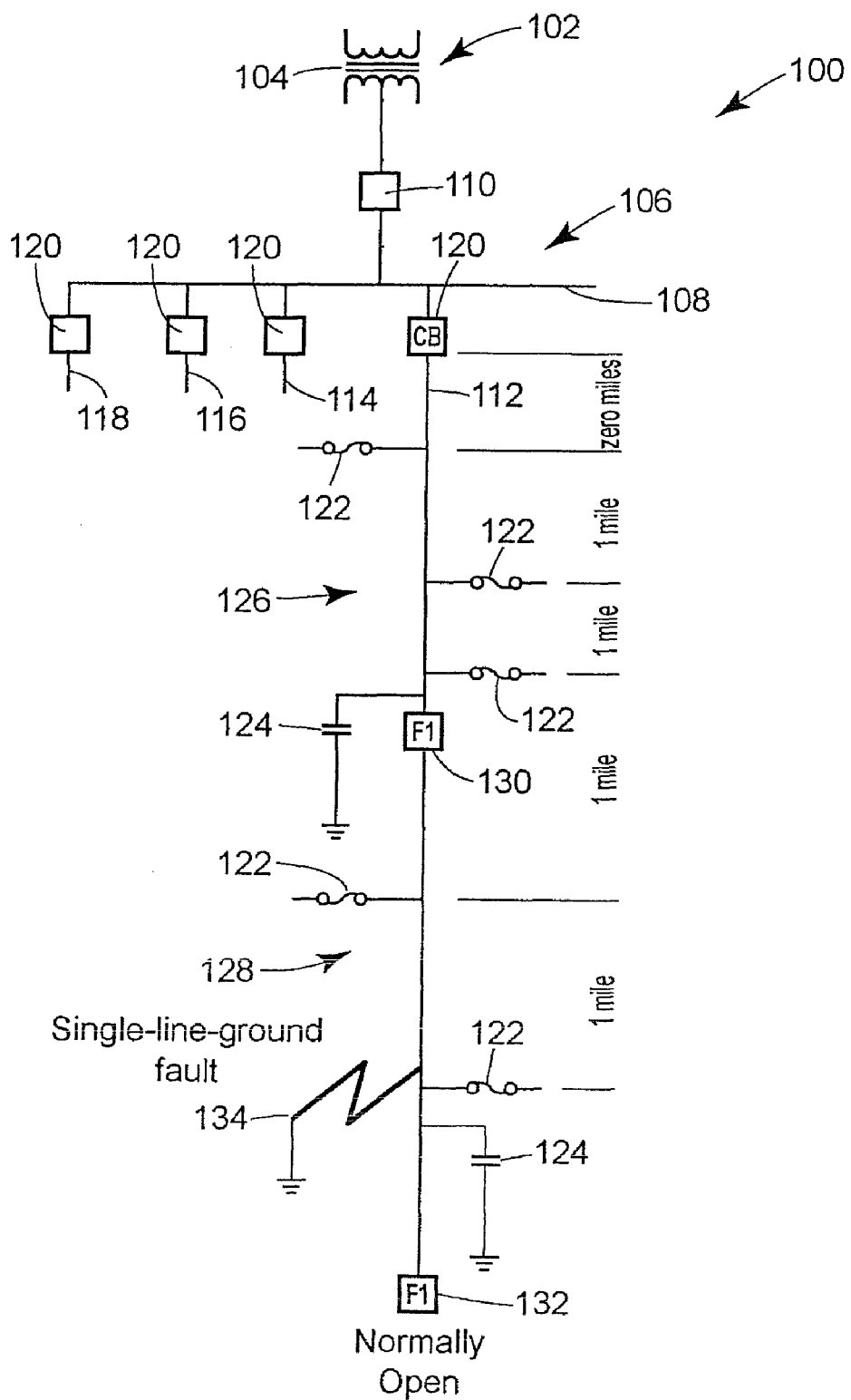
FIG. 1 is a circuit diagram illustrating a single line of a power distribution architecture and a single-line fault within the power distribution architecture.

Referring to FIG. 1, a power distribution system 100 includes a source of alternating current, electrical energy 102. As depicted in FIG. 1, the source is a step-down transformer 104 from a high-voltage distribution source that is supplied by a generation source (not depicted) that feeds a secondary distribution network 106. The secondary distribution network includes a distribution bus 108 coupled to the transformer 104 by a fuse or circuit breaking device 110. The distribution bus 108 feeds a plurality of distribution lines 112, 114, 116 and 118, each of which is coupled to the distribution bus by a fuse or circuit breaking device, e.g., devices 120. For illustration purposes, a plurality of typical inductive/resistive loads, e.g., loads, are coupled to the distribution line 112 by a fuse or circuit breaking device, e.g., devices 122 as are capacitive loads 124. The line 112 may be segmented in a first portion 126 and a second portion 128 by a circuit testing closer 130. The line 112 may also connect to a second source of electrical energy (not depicted) via a another circuit testing closer 132. Moreover, the lines are shown as single conductors, but it will be appreciated that the lines may represent multiple phases, e.g., three phases, of a multi-phase alternating current power distribution system. In such an arrangement a circuit testing closer is typically provided for each phase.

If the line 112, or any of the phases of the line 112, is faulted, for example by a coupling to ground 134, the circuit testing closer 130 is operable to detect the fault 134 and to open to isolate the fault from the energy source. If the fault were to occur between the circuit testing closer 130 and the energy source, the circuit testing closer would be operable to isolate the second portion 128 of the line 112 from the energy source so that the second portion 128 may be coupled to the second energy source by closing the circuit testing closer 132, thereby restoring at least partial service within the power distribution network 100.

Figure 2:
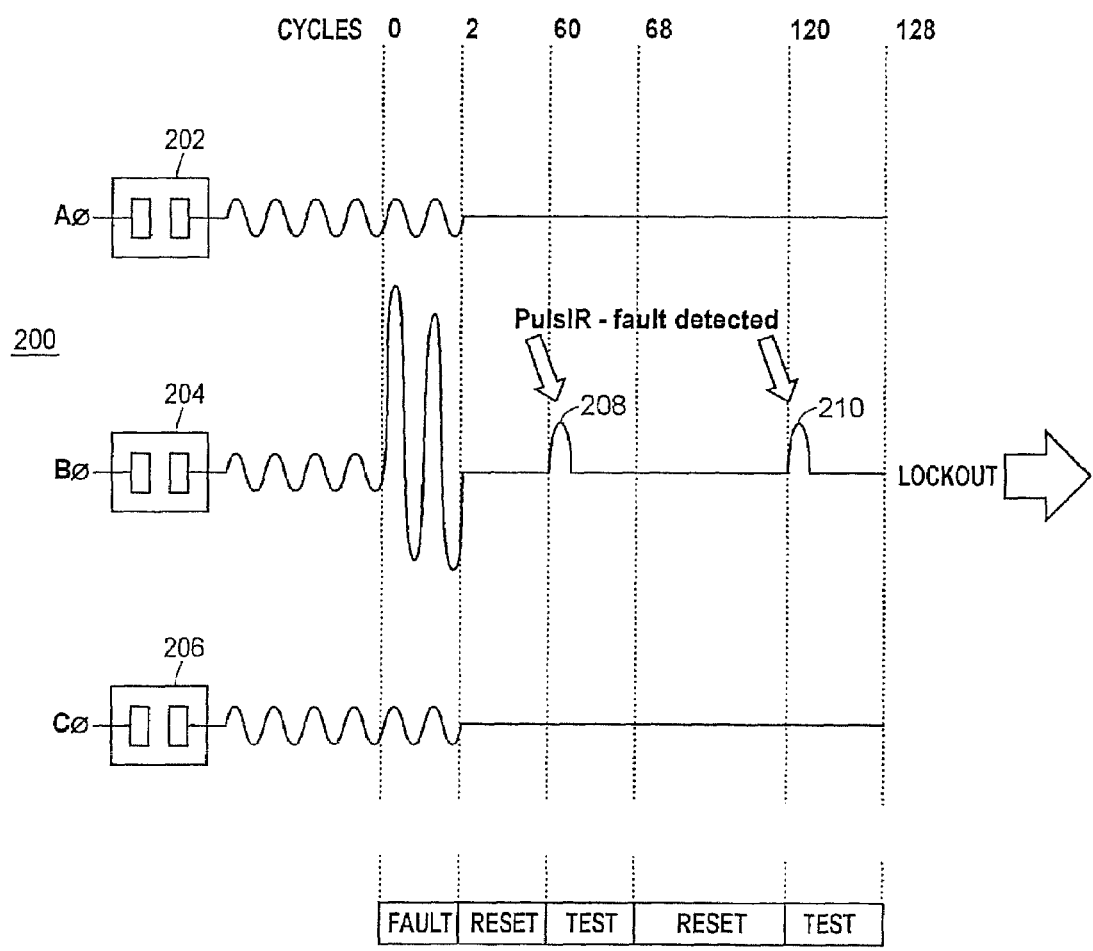
FIG. 2 is a graphic illustration of a fault current waveform and a corresponding test pulse sequence determining a persistent line fault.

The circuit testing closer 130 may operate to detect the fault in any suitable and known manner, for example, detecting current above a threshold value for a predetermined number of cycles. The manner by which the circuit testing closer 130 detects the initial fault 134 is not material to the overall operation of the circuit testing closer 130, and any suitable fault detection method may be employed. Referring to FIG. 2, in a three phase power distribution network 200 there are three phases 202, 204 and 206. A fault is depicted in the phase 204 by the excess current existing for at least two cycles. The fault results in the circuit testing closers, for example circuit testing closers 130, associated each of the three phases 202, 204 and 206 opening to isolate the fault. Next the circuit testing closers begin a procedure to determine whether the fault is cleared before beginning a reclosing process.

While the testing process may begin with any of the three phases, it may be possible to predict on which phase the fault occurred and begin the process with that phase. Without such knowledge a trial and error process may be used. That is, the first phase 202 may be tested, and if no fault found, the second phase 204 may be tested and so on until either a phase is found with a persistent fault or all three phases test without fault, indicating the fault has cleared. FIG. 2 illustrates line testing by way of a current pulse, test current loop or "ping". The current pulse is generated by closing the circuit testing closer in a controlled manner and for a brief period of time, e.g., a fraction of cycle. The resulting current pulse is analyzed, and the existence of a fault on the phase is confirmed. As shown in FIG. 2, the phase 204 is tested twice over a period of approximately 60 cycles, or 1 second, with both tests indicating a fault. As a result, the circuit testing closers for each of the phases 202, 204 and 206 are locked out until reparative measures may be taken to clear the persistent fault.

By "pinging" the phases only a small, transient test current loop is generated, e.g., test current loops 208 and 210 in FIG. 2. These small, transient current loops do not introduce the stress into the power distribution network 200 that simply closing the line into the fault would do. The test current loops are sufficient to determine whether the fault has cleared or whether it is persistent. The first ping may occur shortly after the initial fault, with the subsequent pings being spaced equally in time or in accordance with a schedule wherein a rest period between pings is shortened or extended as the case may be.

Figure 3:
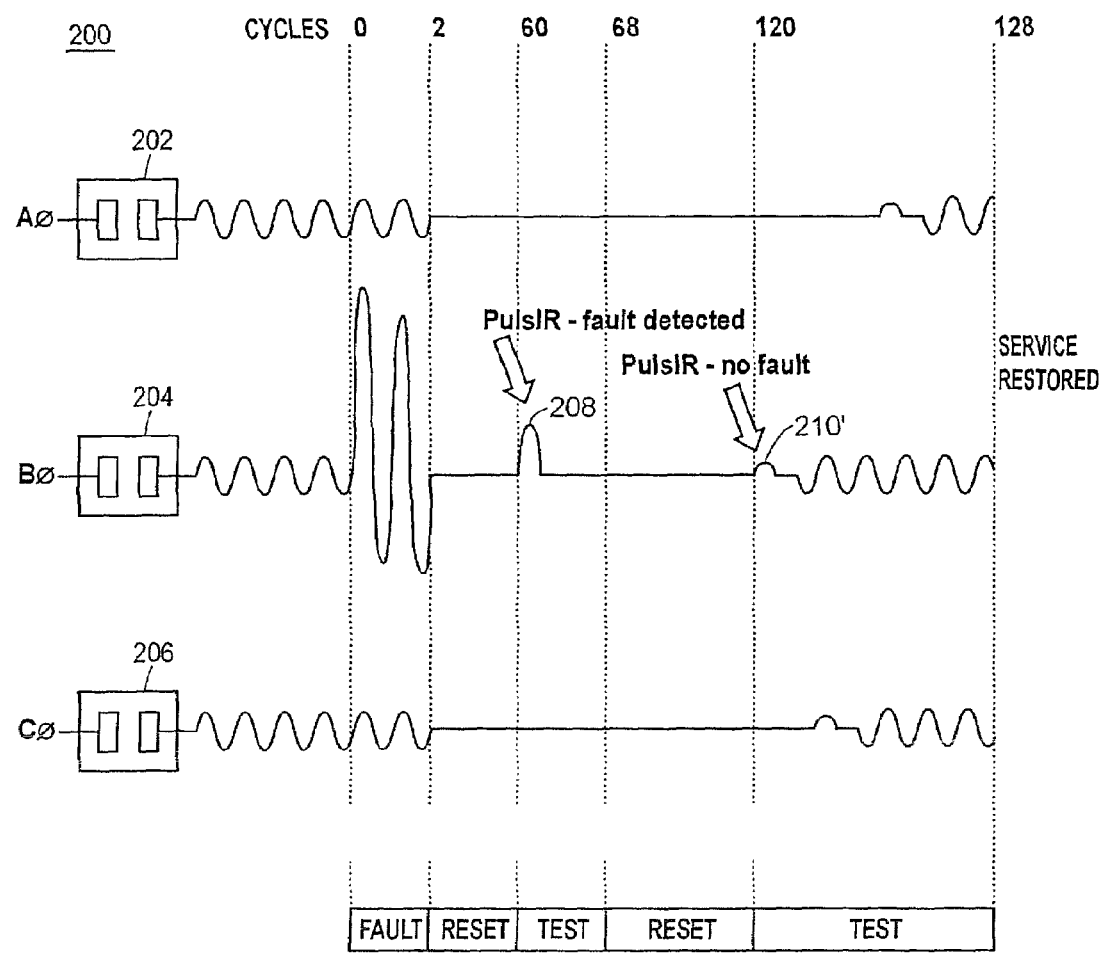
FIG. 3 is a graphic illustration of a fault current waveform and a corresponding test pulse sequence determining a transient line fault and service restoration.

FIG. 3 illustrates the same situation as in FIG. 2, with the exception that by the time the circuit testing closer generates the second test current loop, depicted as test current loop 210', the fault has cleared. Providing the remaining phases are fault free, assumed for this example, the circuit testing closers close each phase to restore service to the power distribution network 200. The circuit testing closers may reclose the phases in a predetermined sequence and/or in accordance with a suitable protocol to reduce current anomalies during the closing process.

Figure 4:
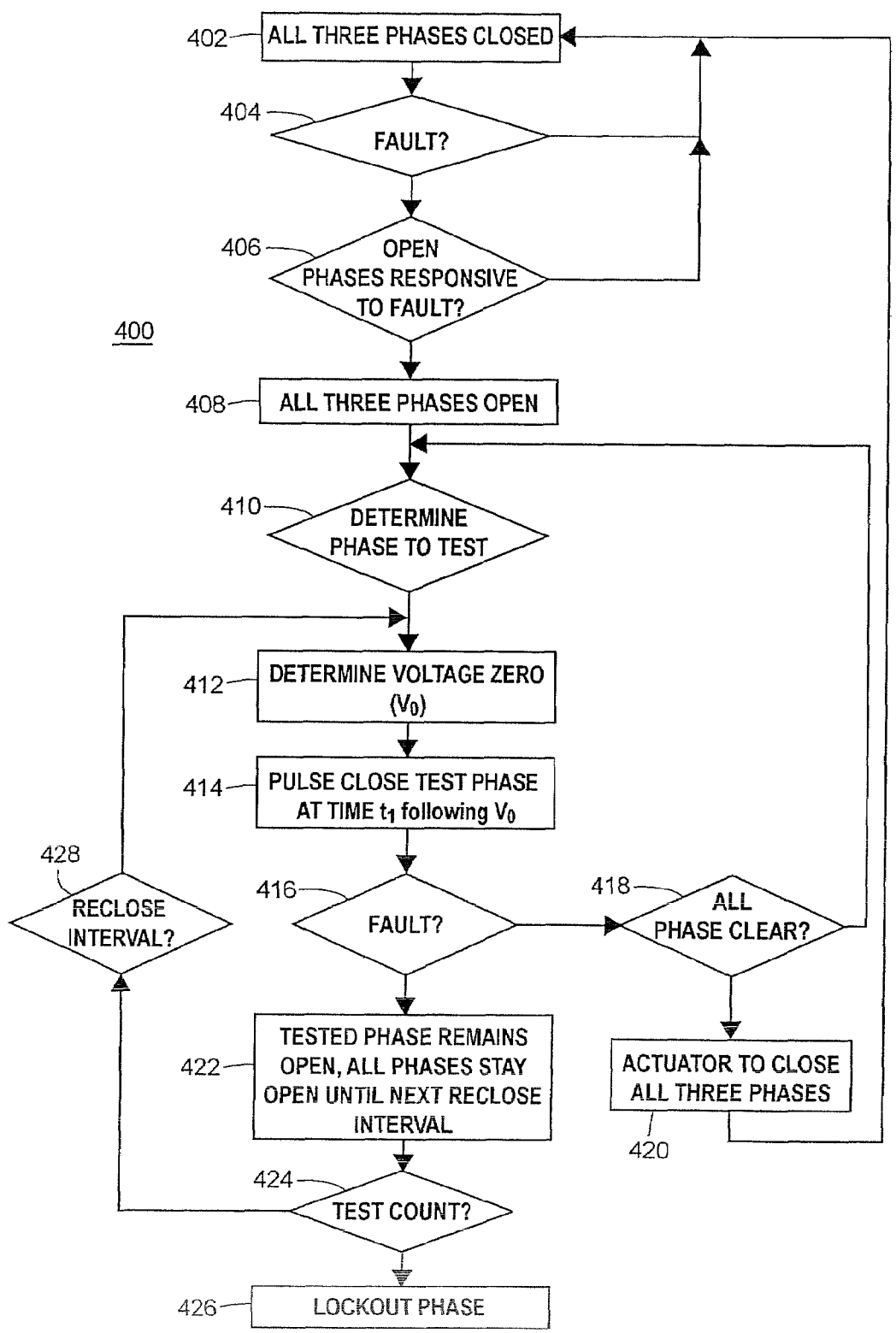
FIG. 4 depicts a flow chart illustrating a process for fault testing and service restoration.

As appreciated from the foregoing discussion, the circuit testing closers employ an algorithm or protocol for, following fault isolation, testing and closing to restore service or testing and locking out if the detected fault is persistent. FIG. 4 illustrates a method 400 that may be employed. With the three phases closed, 402, the circuit testing closer may monitor for a fault or other diagnostic systems may monitor for faults. That is, the circuit testing closer, such as the circuit testing closer 130 may include sufficient sensing capability to sense and determine the existence of a fault in the line/phase to which it is connected. Alternatively, another control element may be disposed in the system to sense for faults and to make control decisions. In such an arrangement, the circuit testing closer 130 may include a communication link to the control element to receive operating commands and instructions for affecting operation of the circuit testing closer 130.

In either case, each phase is monitored for a fault, 404. Absent a fault in one of the three phase, the system continues to monitor for a fault. Upon occurrence of a fault, 404, the circuit testing closer may determine whether to open the phases in response to the fault, 406. If the phases are to remain closed, the system continues to monitor for a fault, 404. Otherwise, the circuit testing closer for each phase opens to isolate the fault resulting in all three phases being open, 408 (or single-phase isolation if selected by the user. The circuit testing closer then initiates a test process to determine whether the fault is transient or persistent, and if persistent, on which phase the fault occurred.

A determination is first made which phase to test, 410. This determination may be based upon having already tested one or more phases and found them to be fault free, and thus a remaining phase of the untested phases is selected to be tested. Initially, the circuit testing closer and/or the control element may have knowledge based upon operating characteristics of the phase prior to the fault of which phase is likely to have faulted. In that case, it may determine to first test the suspect phase. Following determination of the test phase, 410, the test procedure begins. Moreover, it may be desirable to check for the voltage zero across contacts to be closed, i.e., the closer contacts. An alternative to is to sense the voltage zero on the source side voltage. Source side voltage sensing has the advantage of only requiring sensing on one side of the closer; however, it is less accurate. Selection of more accurate cross-contact voltage sensing or source side voltage sensing may depend on the apparatus used to generate the test pulse.

To determine whether the phase is experiencing a fault current or a load current, the circuit testing closer is operable to pulse close the phase to generate a test current loop. The test current loop is indicative of whether the phase is faulted or clear. To generate the test current loop, voltage across the phase is measured to determine a voltage zero ($V_O$), 412. Determining the voltage zero allows the current loop to be generated at a point in the voltage wave such that the generated current loop is sufficient for evaluation, but does not generate an excessively large current loop, as may happen if the phase is closed into a fault and/or at a less advantageous point on the voltage wave. An advantageous point on the voltage wave following the voltage zero is a point with a voltage sufficient to breakdown weak insulation and approaching zero to provide a current zero shortly after the pulse current begins. While it is advantageous and desirable to select the point of the voltage wave for generating the current loop to help control the characteristics of the current loop, it is not necessary to select the timing as described.

Figure 5:
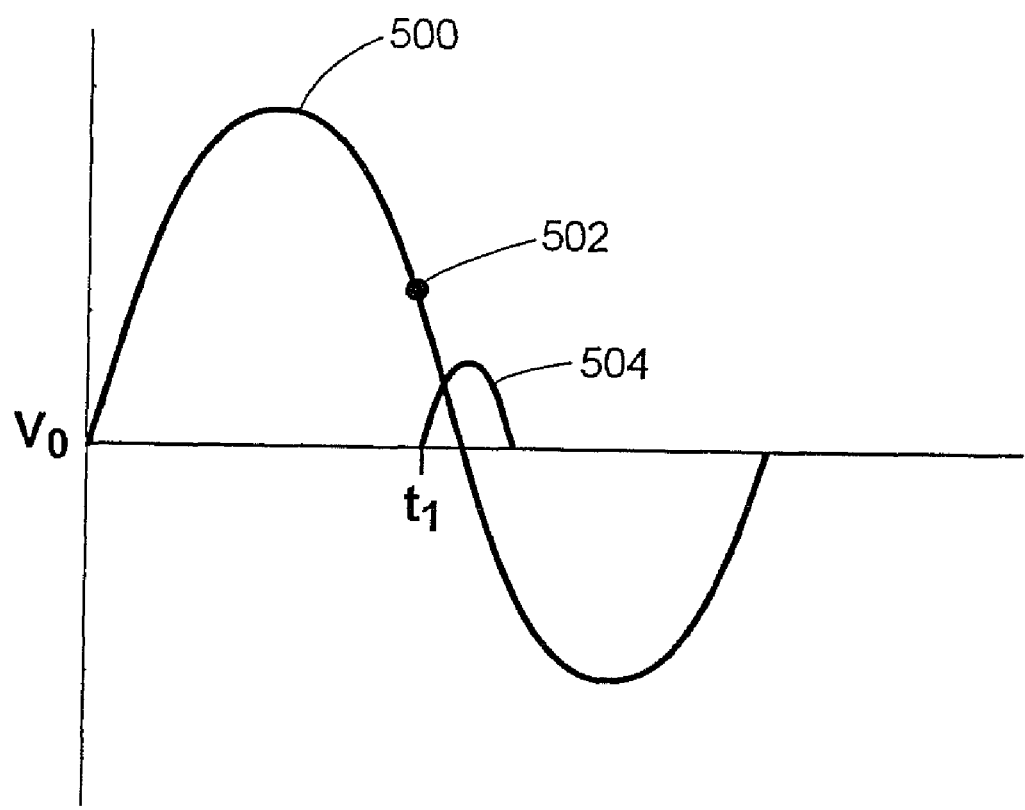
FIG. 5 is a graphic illustration of a voltage and current loop waveform responsive to a test pulse.

Having determined the voltage zero, the current loop may be generated at a time $t_1$ following the voltage zero. The voltage wave 500 illustrated in FIG. 5 shows the point 502 on a descending portion of the voltage wave 500 at a time $t_1$ following the voltage zero. The current loop is generated by pulse closing the contacts of the circuit testing closer. That is, the contacts within the circuit testing closer are brought together for a brief period of time, a fraction of a cycle, but sufficiently long that a current loop is generated in the phase, and then are separated. The current loop 504 responsive to pulse closing the phase is also illustrated in FIG. 5. The resulting current loop is analyzed to determine if it is indicative of load or fault, 416. That is, various characteristics, e.g., the magnitude of the current loop, shape of the current loop, offset of the current loop, may be analyzed to determine if the phase is faulted.

If the observed characteristics of the current loop are indicative of load, and no fault condition, and all of the phases are clear, 418, then the three phases may again be closed, 420. At this point service is restored, and all three phases are again closed, 402.

If a fault is indicated, the tested phase remains open until a next testing interval, 422. However, if the test count exceeds a predetermined value, 424, for example a preset number of tests have been conducted, then the fault may be deemed to be persistent, and the phase is locked out, 426. Otherwise, upon expiration of the reclose interval, 428, the current loop generation process repeats.

Regarding the reclose interval, the interval may consist of a constant time, e.g., a time period selected in the range of 0.5-15 seconds between tests. Alternatively, the interval may vary. For example, the first test may be conducted relatively quickly following the fault, e.g., within about 0.5 second. If a fault is detected, the next test may occur at about 1.5 seconds and a third test at about 15 seconds, etc. The exact intervals and as appropriate the rate of increase of time between intervals may be selected based upon the ability of the circuit testing closer to reset and be ready for another test, based upon historical data on mean time until a transient fault clears, or based upon other suitable data other than device characteristic data and/or historical system statistical data. The number of tests before the test count is exceeded may be specified, e.g., lockout after n tests. Alternatively, the test count may be based upon time from fault, e.g., lockout m seconds after the fault. If the fault persists as identified by a fault being indicated following a number of tests, other diagnostics may be conducted to determine the type and location of the fault.

While a sequential process is described, i.e., testing one phase and then moving on to a next phase, it is possible to simultaneously test the phases. In that case, the circuit testing closers for each phase may substantially simultaneously be pulsed closed to generate test current loops for analysis. Furthermore, while the method 400 describes reclosing each of the three phases only after each is determined to be fault free, it may be possible to reclose the phases individually after determining the phase is clear and before moving on to testing another of the phases.

Figure 6:
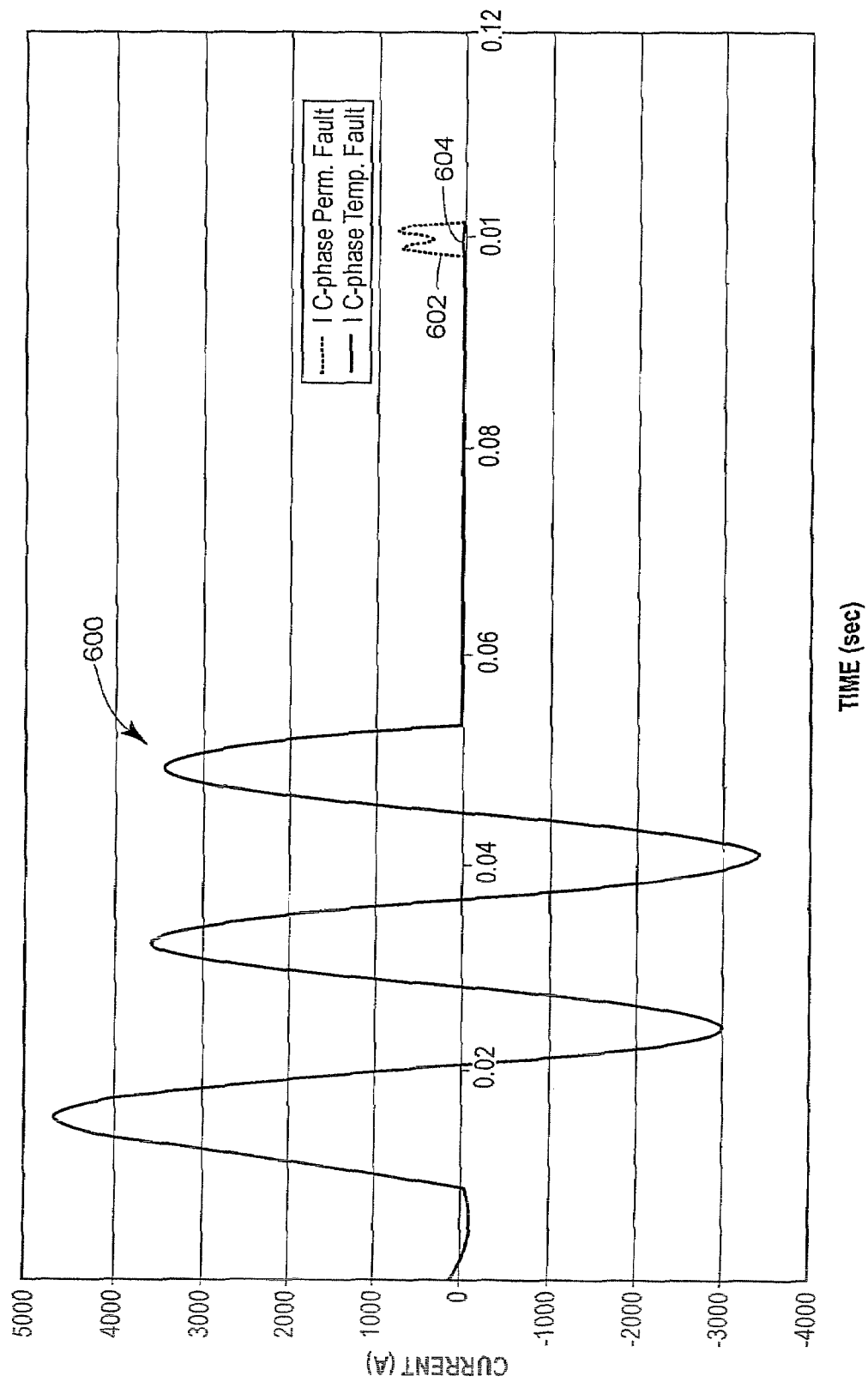
FIGS. 6 and 7 are additional graphic illustrations of a current waveforms responsive to a test pulse indicating a persistent fault and a transient fault for a given load condition.
Figure 7:
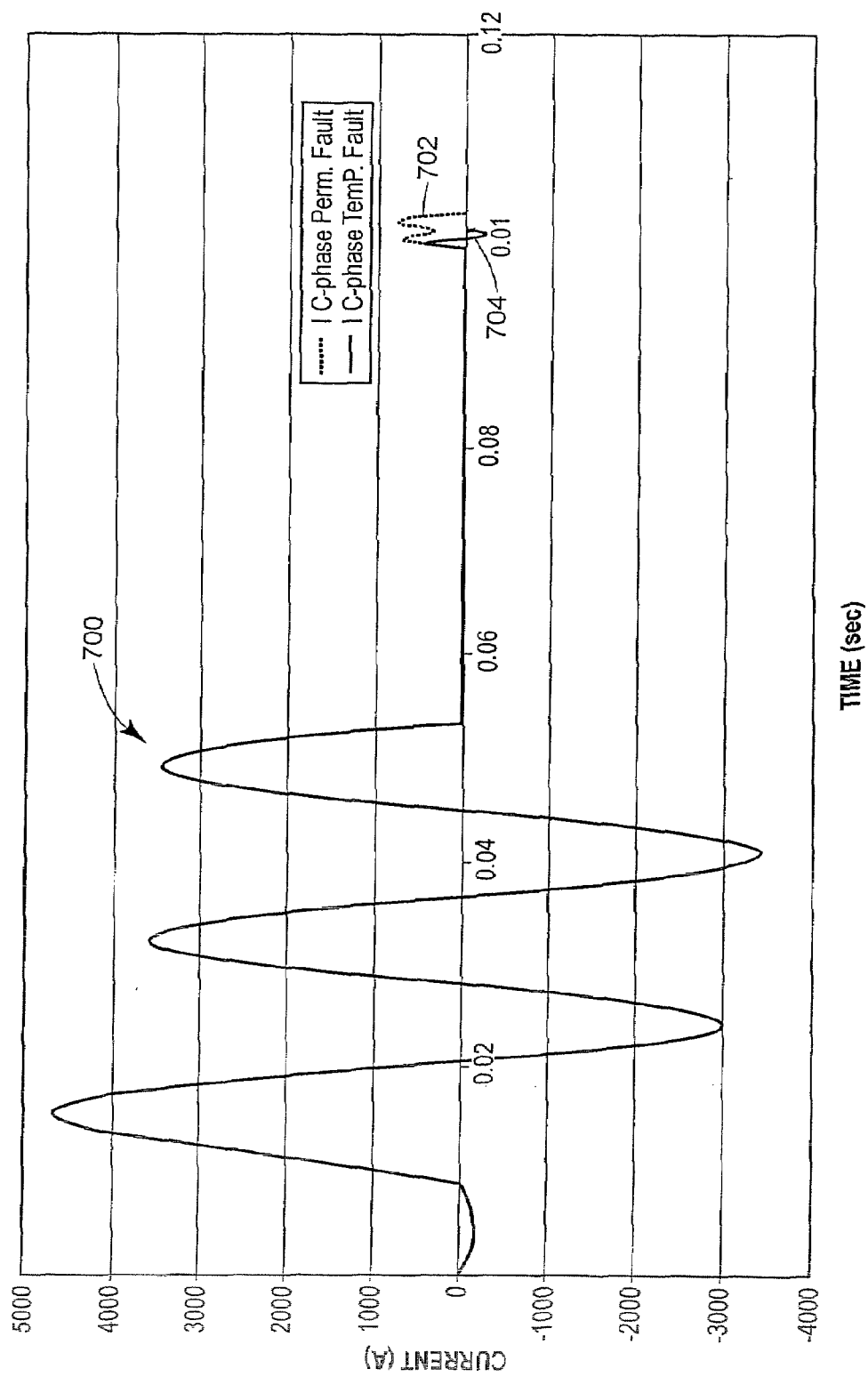

The current loops 210, 210' and 504 in the above referenced illustrations are typical where there is little or no capacitive load either upstream or down stream of the circuit testing closer. A current loop resulting from the pulse closing of the circuit testing closer where there exists capacitive load may appear substantially different. FIG. 6 illustrates current loops 602 and 604 responsive to pulse closing, i.e., "pinging" by the circuit testing closer. FIG. 6 further illustrates test current loops 602 and 604 in relation to a fault current 600. In each case, there is an upstream capacitive load. The test current loop 602 in magnitude and shape is indicative of a fault. The test current loop 604 on the other hand is indicative of load after clearance of a temporary fault. FIG. 7 illustrates test current loops 702 and 704 responsive to pulse closing, i.e., "pinging" by the circuit testing closer. FIG. 7 further illustrates current loops 702 and 704 in relation to a fault current 700. In each case, there is both upstream and downstream capacitive load. The test current loop 702 in magnitude and shape is indicative of a fault. The test current loop 704 on the other hand is indicative of load after clearance of a temporary fault.

It will be appreciated that fault and load current loops for various load conditions may be characterized and utilized by the circuit testing closer to determine a load condition from a fault condition of a tested phased. For example, a relatively high average current proportional to the short-circuit current magnitude, i.e., average $I_{test\ loop} > \alpha * I_{short-circuit}$ indicates a permanently faulted line segment. Alternatively, a relatively low average current in proportion to the short-circuit current, i.e., average $I_{test\ loop} < \alpha * I_{short-circuit}$ indicated an un-faulted line segment. However, it may not always be possible to know the short-circuit current, and therefore, may not be possible to compare the test loop current to the short-circuit current. In such cases, it is possible to define the test in terms of relative values. For example, a test loop current that is high in comparison to a threshold value, e.g., 800 amps, and/or a test loop current that is high in comparison to a lower threshold value, e.g., 100 amps, but for a longer duration of time, e.g., 4 ms for a closing angle of 120° indicates a permanently faulted segment. A relatively low average test loop current, less than 100 amps, for example, or for a relatively short duration, less than 4 ms, for example, may be indicative of an un-faulted line.

Other characteristics of the current pulse may be observed to determine the existence of a permanent fault. For example, it is possible to observe the current pulse peak current. Peak current of the pulse in excess of 500 A may indicate a permanent fault. Alternatively, the peak pulse current, as a percentage of root means square (RMS) fault current, in excess of 33% may indicate a permanent fault. Pulses with peak currents in excess of 75*pulse_duration (ms), and durations in excess of 4 ms may indicate a permanent fault.

It is possible to observe the integral of the current pulse to indicate the existence of a permanent fault. For example, a pulse with a charge in excess of 2 A·s may indicate a permanent fault. Similarly, a pulse with a charge in excess of 0.001 times RMS_fault_current (A) may indicate a permanent fault.

The number of changes in the sign of the di/dt of the current pulse may be an indicator of a temporary fault. A pulse's di/dt having a number of changes in sign in excess of 10 may indicate a temporary fault. Similarly, a pulse's di/dt having an odd number of changes in sign may also indicate a temporary fault.

The average voltage at the load side during the current pulse may be an indicator of a fault. An average load side voltage during the circuit testing in excess of 0.1 pu may indicate a temporary fault. Alternatively, an average voltage during the circuit testing in excess of 0.033*(pulse_duration (ms)−4)+0.05 may indicate a temporary fault.

The energy of the current pulse may be an indicator of a fault. Pulse energy below 1333·(pulse_duration (ms)−4) and duration in excess of 4 ms may indicate a permanent fault.

The current pulse $I^2t$ may be an indictor of a fault. Pulses with an $I^2t$ in excess of 1000 $A^2t$ may indicate a permanent fault. Pulses with an $I^2t$ in excess of 0.5·(I short-circuit RMS−500) may also indicate a permanent fault.

The pre-fault load current versus current pulse current or parameters and/or the wave form of the current pulse may indicate a fault. Pre-fault load current can be used in combination with other pulse parameters to increase fault detection accuracy. For instance, and pulse with an average current in excess of 2·I prefault load RMS+100 may indicate a permanent fault. Similar relationships can be found using peak current and charge.

The pulse waveform and identification of particular waveforms may indicate a permanent fault. Normalized signal errors with a standard deviation in excess of 0.1 indicate a temporary fault. The signal error can be defined as the difference between the actual test loop current and the ideal test loop current of a pure inductive circuit. Similarly, pulse waveform identification techniques can be used to estimate the short circuit current magnitude. For instance, knowing the pulse angle ($\theta$) and the average current of the pulse it is possible to estimate the short circuit current using the equation:

$$I_{RMS\ short-circuit} = \frac{I_{average}}{\sqrt{2}} \cdot \frac{(\pi - 2 \cdot \theta)}{\cos(\theta) - \cos(\pi - \theta) - (\pi - 2 \cdot \theta) \cdot \sin(\theta)}$$

Based on the estimated magnitude of the short-circuit current it is possible to determine if the feeder is faulted or un-faulted for a given the minimum pickup current. One will appreciate that various combinations of these techniques may also be employed.

The circuit de-energized as a result of fault isolation will likely contain one or more power transformers (e.g., FIG. 1, 104). In certain circumstances, the power transformers may contain a remnant flux. With inopportune reenergizing, the transformer core can be driven into saturation, drawing fault-like current. If this occurs during generation of a current loop to determine fault persistence, a fault testing closer may indicate a permanent fault where none exists.

It is possible to avoid transformer saturation during generation of the current pulse by configuring a fault testing closer, such as any of the herein described embodiments of fault testing closers, to track the flux in the transformer. Transform flux may be determined by integrating the energizing voltage. Upon de-energization, the voltage integral becomes time invariant, and the magnitude and polarity of the integrand provides a direct indication of the remnant flux. Choosing to reenergize when the voltage polarity opposes the remnant flux avoids inrush currents during the initial energization.

Another method to avoid misinterpreting transformer inrush current as fault current is to configure the fault testing closer, such as any of the herein described embodiments of fault testing closers, to pulse twice sequentially, using different polarities for each pulse. A fault will allow fault current to flow during both pulses, whereas transformer inrush current will not flow for both polarities. However, to avoid generating two pulses during each testing cycle and to limit the total number of pulse operations, it may be possible to use a single pulse polarity initially and to re-pulse only if the first pulse indicates a possible fault. A still further alternative limiting the total number of pulses, is to use a single pulse polarity for all but the last pulse in a test sequence. If a fault is still indicated at the last or possibly next-to-last pulse of a sequence, the last pulse or a re-pulse following the last pulse may then be used to confirm a possible fault.

As described, the closer 130 may include a controller or be coupled to a controller that incorporates a control program for providing fault testing functionality. The various described tests may be employed in connection with these controllers, or with other control and decision making devices and techniques. For example, wavelet transformation analysis and neural network may be used to implement these or other algorithms for determine the fault state of the tested line segment. In such a case, the controller is adapted to effectively discriminate between the current pulse waveform associated with faulted lines under various fault conditions and those of un-faulted lines. Accuracy may be improved if saturation of downstream transformers is avoided during the circuit testing. The transformer inrush current can have a relatively high peak current and long duration current pulses, making it difficult to discriminate permanent faults from temporary faults. Saturation effects can be reduced by selecting the initial closing angle based on the flux magnitude. Thus, for a positive flux, an acceptable initial closing angle is just prior to the voltage zero following the negative peak voltage, while a negative flux an initial closing just prior to the voltage zero following the positive peak voltage may be used. In addition, confusion stemming from the inrush current of saturated transformers can be reduced by testing with current pulses of both polarities. Faulted lines will exhibit pulses indicative of a fault with both polarities, while an indication of a fault due to inrush current will be absent from at least one polarity.

Because predicting the existence of a fault condition based upon the "ping" is not perfect, the process could conclude that there is no fault when a fault does exist. This leads to the undesirable outcome of closing into a fault. Likewise, the process could conclude there is a fault when the fault has cleared. This results in unnecessary service interruptions and outages for customers.

In accordance with another embodiment of the invention a dynamic current threshold may be used during the fault testing, i.e., "pinging" process. For an initial fault test, a threshold may be chosen that favors finding a fault so as to avoid determining a fault does not exist and closing into it. For subsequent tests, the criteria may be changed to bias toward finding no fault. The last fault test in such a sequence may be relatively aggressive toward finding no fault in order to favor service restoration. For a single test procedure, one may elect a conservative or aggressive approach. It may be necessary to additionally establish criteria that must be met for the test procedure to be effective.

The threshold, or fault determination criteria may be related to an operating characteristic of the fault protection device. For example, phase overcurrent is a suitable criteria to use to predict existence of a fault based upon a test result, and a phase overcurrent threshold may be related to the minimum response cutoff current of the fault protection device. Advantageously, a dynamic phase overcurrent threshold is determinable within the associated controller. The dynamic phase overcurrent threshold may be applied in either a single test procedure or a multiple test procedure.

In a single test procedure, the fault threshold may be related to a fault protection device response characteristic. In one embodiment, the threshold may be taken as 150% of the minimum response cutoff current of the fault protection device. The determined single test threshold may furthermore be adjusted based upon cold load and other factors. Furthermore, if the fault protection device configured to have multiple response characteristics, the threshold should be based upon the smallest minimum response current cutoff. Or, more generally, if the fault protection device is operable responsive to multiple characteristics, the threshold should be based upon the characteristic resulting most favoring fault determination.

In a multiple test procedure, multiple threshold are required. An initial threshold may be taken as the lesser of:

1) 80% of the minimum response cutoff current of the fault protection device, multiple by the cold load factor, if any; and
2) three times the pre-fault load current, if known.

The pre-fault load current may be a measured valued based upon an average true RMS phase current (for each of the phases). The averaging period may be approximately 1 second. The known load current may be continually updated if: the fault protection device is closed (no zero value); no overcurrent/fault current element is picked up (avoids fault current) and the ATX Tripped Flag is not set (preventing a value calculated during a Pulse-test/close sequence).

The threshold for the last test of the multiple test procedure may be taken as the greater of:
1) 150% of the minimum response cutoff current of the fault protection device, multiple by the cold load factor, if any; and
2) a minimum current threshold.

The minimum current threshold may be based upon a minimum resolvable current value. For example, the minimum current threshold may be 400 amps (A). An ability to resolve lower fault current values will allow the minimum current value to be less.

The intervening thresholds may be determined by linear interpolation between the initial and the last values. In addition, field experience may suggest modification to the criteria used to establish the initial, intervening and last threshold values.

The following is an example of how the thresholds may be calculated:

Input data . . . (Renee please insert from page 4/5 and 5/5 of disclosure)

For either a single test procedure or a multiple test procedure, if different direction fault protection devices are specified or a different directional cold-load factor exists for the respective directions, the following criterion may be used to determine the thresholds. The fault protection device characteristic associated with the lowest positive sequence voltage is used to determine the threshold. Positive sequence voltage calculations must be performed before initiation of the test sequence to account for possible system reconfigurations. For example, if the Y side of the fault protection device is energized ($|V_{positive\ sequence\ y}| > |V_{positive\ sequence\ x}|$), the fault protection device and the cold-load factors for faults on the X side are used, where V is the positive sequence fundamental frequency voltage RMS in percentage.

While in a preferred embodiment the thresholds may be set automatically by the controller, the threshold values may be user specified.

While the foregoing describes the algorithm on a single-phases basis, for use in grounded systems, the algorithm can be extended for use in ungrounded systems. This is accomplished by first applying it to two phases (using phase-to-phase voltage—and closing two poles simultaneously) and then to the third pole—but only if the first two are shown to be un-faulted (using phase-to-ground voltage).

Figure 8:
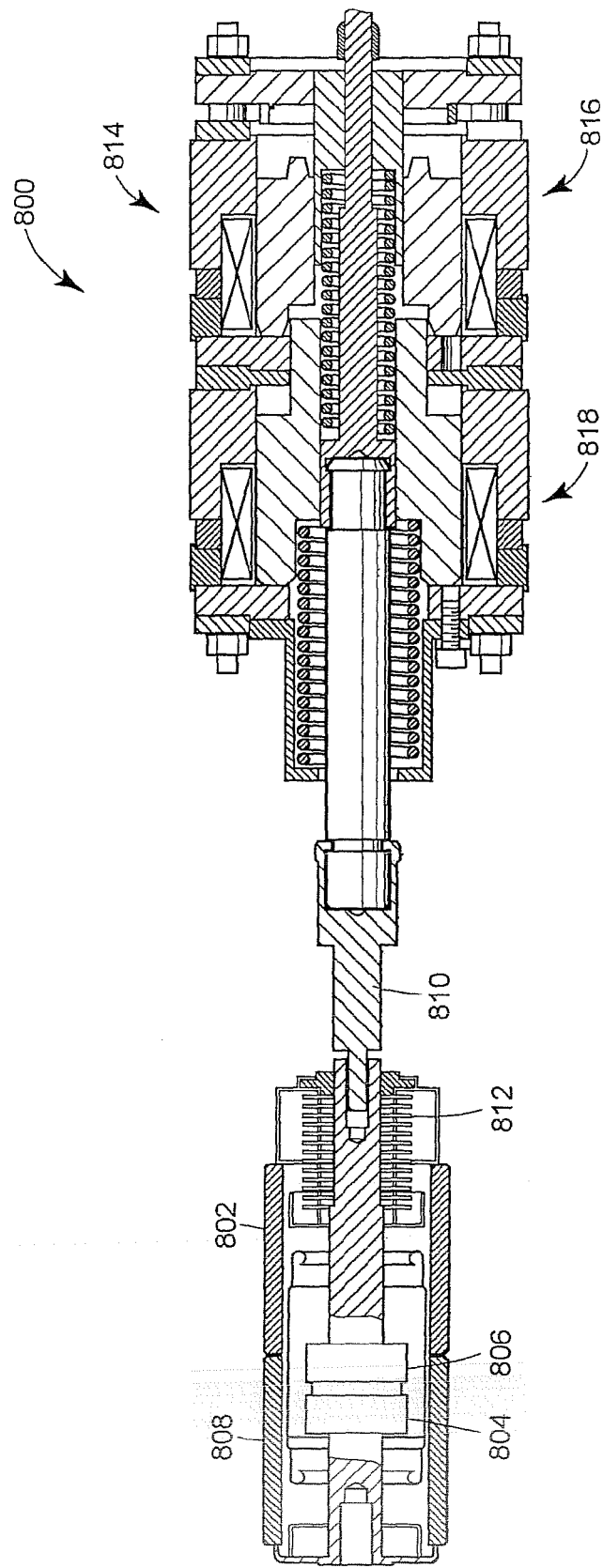
FIG. 8 is a schematic cross-section view of a circuit testing closer adapted to provide a test pulse in accordance with one of the herein described embodiments.

The power distribution system 100 and the method described in connection therewith and in connection with FIGS. 2-4 employ a circuit testing closer, e.g., circuit testing closer 130. The circuit testing closer may be a mechanical device, electro-mechanical device or a solid-state electrical device. FIG. 8 is a cross-section view of a circuit testing closer 800. The circuit testing closer 800 includes a vacuum interrupter 802 having a stationary contact 804 and a moving contact 806. The contacts 804 and 806 are disposed within a vacuum bottle 808 as is well known in the art, and the moving contact 806 couples externally of the vacuum bottle 808 to an insulated actuating rod 810, a vacuum being maintained by the bellows 812. The actuating rod 810 couples to an actuator assembly 814 including a main actuator 816 and a secondary actuator 818. The vacuum interrupter 802, insulated actuating rod 810 and actuator assembly 814 are disposed within a suitable housing (not depicted) as is well known in the art. A processor coupled to a suitable control program may also be provided to control the operation of the circuit testing closer 800 as herein described.

Figure 9:
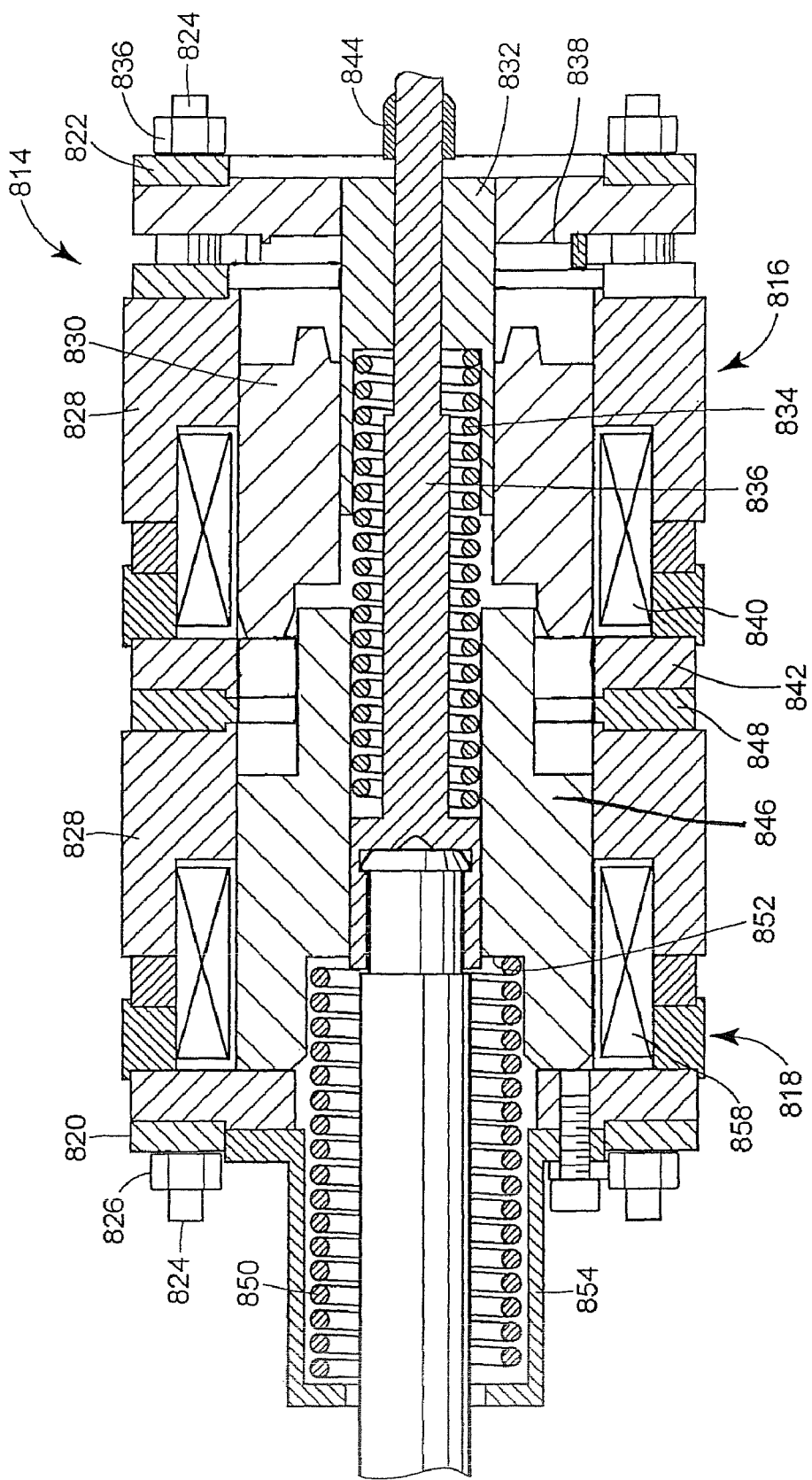
FIG. 9 is enlarged view of an actuator portion of the circuit testing closer illustrated in FIG. 8.

FIG. 9 is an enlarged illustration of the actuator assembly 814. The operative elements are retained between a pair of end plates 820 and 822 that are secured by longitudinally threaded rods 824 and nuts 826 and within a plurality of steel stator members 828. A main actuator plunger 830 is axially slideable within the actuator assembly 814 from an open position to a closed position (the closed position illustrated in FIG. 9). The main actuator plunger 830 couples to a spring retainer 832 for retaining a main contact compression spring 834, which is disposed about a main contact ferrule 836. The main actuator plunger 830 is held open by a hold open magnet 838, and may be driven to the closed position by energization of a main plunger coil 840 to provide a magnetic force to overcome the force of the hold open magnet 838 and internal friction resisting movement of the main actuator plunger 830. The main actuator plunger 830, the spring retainer 832, the main contact compression spring 834 and the main contact ferrule 836 are arranged to move together from the open position to the closed position until contacts 804 and 806 make, at which time the main contact ferrule 836 stops. Once contacts 804 and 806 make, the main actuator plunger 830 continues to move past the position where moveable contact 806 engages the stationary contact 804 of the vacuum interrupter 802 such that the main contact compression spring 834 is compressed providing the necessary contact force on the stationary and moveable contracts 804 and 806, respectively. The main actuator plunger 830 is retained in the closed position by a main actuator plunger hold close magnet 842.

To open the contacts 804 and 806, the main plunger coil 840 is pulsed with an electric current of opposing polarity sufficient in combination with the contact compression spring 834 force to overcome the force of the main actuator plunger hold close magnet 842 and the main actuator plunger 830 moves to the open position. The main actuator plunger 830 continues moving towards the open position, and the spring retainer 832 impacts an elastic step nut 844 threaded onto an end of the main contact ferrule 836, which pulls the contacts 804 and 806 open.

The secondary actuator 818 includes a secondary actuator plunger 846 disposed for sliding movement over the main contact ferrule 836 and the main contact compression spring 834. The secondary actuator plunger 846 is held in a closed position by a secondary actuator hold closed magnet 848. In the held closed position, the secondary actuator plunger 846 compresses a secondary actuator compression spring 850 between a shoulder portion 852 of the secondary actuator plunger 846 and a spring retainer 854 secured to an end of the actuator assembly 814. In normal open and close operation of the circuit testing closer 800, the secondary actuator plunger 846 is held in the closed position.

Following a fault causing the main actuator plunger 830 to move to the open position, and thus to open the contacts 804 and 806, a circuit testing operation is set to begin. The main actuator 816 is pulsed and a magnetic force is developed in the main actuator plunger coil 840 overcoming the main actuator plunger hold open magnet 838. The main actuator plunger 830 moves toward the closed position along with the main contact ferrule 836 and the moveable contact 806 coupled via the insulated connecting rod 810. Shortly after the main actuator plunger 830 begins to move toward the closed position, the secondary actuator 818 is pulsed developing a magnetic force in the secondary actuator plunger coil 858 unlatching the secondary actuator plunger 846 from its held closed position. The secondary actuator plunger 846 begins to move driven by the secondary actuator compression spring 850 in a direction opposite the main actuator plunger 830. The pulsing of the main actuator 816 is to affect closing of the contacts 804 and 806 to generate a brief current loop. As described above, the pulsing of the main actuator 816 may be timed so that the contacts 804 and 806 close at a specific point on the voltage wave follow a voltage zero.

Timing is also controlled between the pulsing of the main actuator 816 and the secondary actuator 818 to ensure an impact between the main actuator plunger 830 and the secondary actuator 846 almost instantaneously with the closing of the contacts 804 and 806. At the point of contact, the main actuator plunger 830 continues to travel to the closed position to charge the main contact compression spring 834. The contacts 804 and 806 remain in contact. The secondary actuator plunger 846 is now traveling much faster than the main actuator plunger 830, and, upon impact, drives the main actuator plunger 830 toward the open position further powered by the at least partially charged main contact compression spring 834. As the main actuator plunger 830 travels toward the open position, impact is made with the elastic step nut 844 threaded to the end of the main contact ferrule 836 pulling the contacts open, as in normal operation. The impact between the main actuator plunger 830 and the secondary actuator plunger 846 creates sufficient impact force on the main actuator plunger 830 to drive it back toward open and to impact the elastic step nut 844 to achieve separation of the contacts 804 and 806 and a sufficient open gap to extinguish the arc. The timing of the pulsing of the secondary actuator 818, the travel time of the retreating secondary actuator plunger 846 toward the advancing main actuator plunger 830, the reversal of travel of the main actuator plunger 830 and the impact of the main actuator plunger 830 with the elastic step nut 844 may made sufficiently precise that the contacts 804 and 806 are caused to open at substantially the current loop zero (see current loops 210, 201' and 504, above, for example). Once the contacts 804 and 806 are opened and the main actuator plunger 830 is retained in its held open position by the main actuator plunger hold open magnet 838, the secondary actuator 818 may be pulsed to return the secondary actuator plunger 846 to its held closed position.

Figure 10:
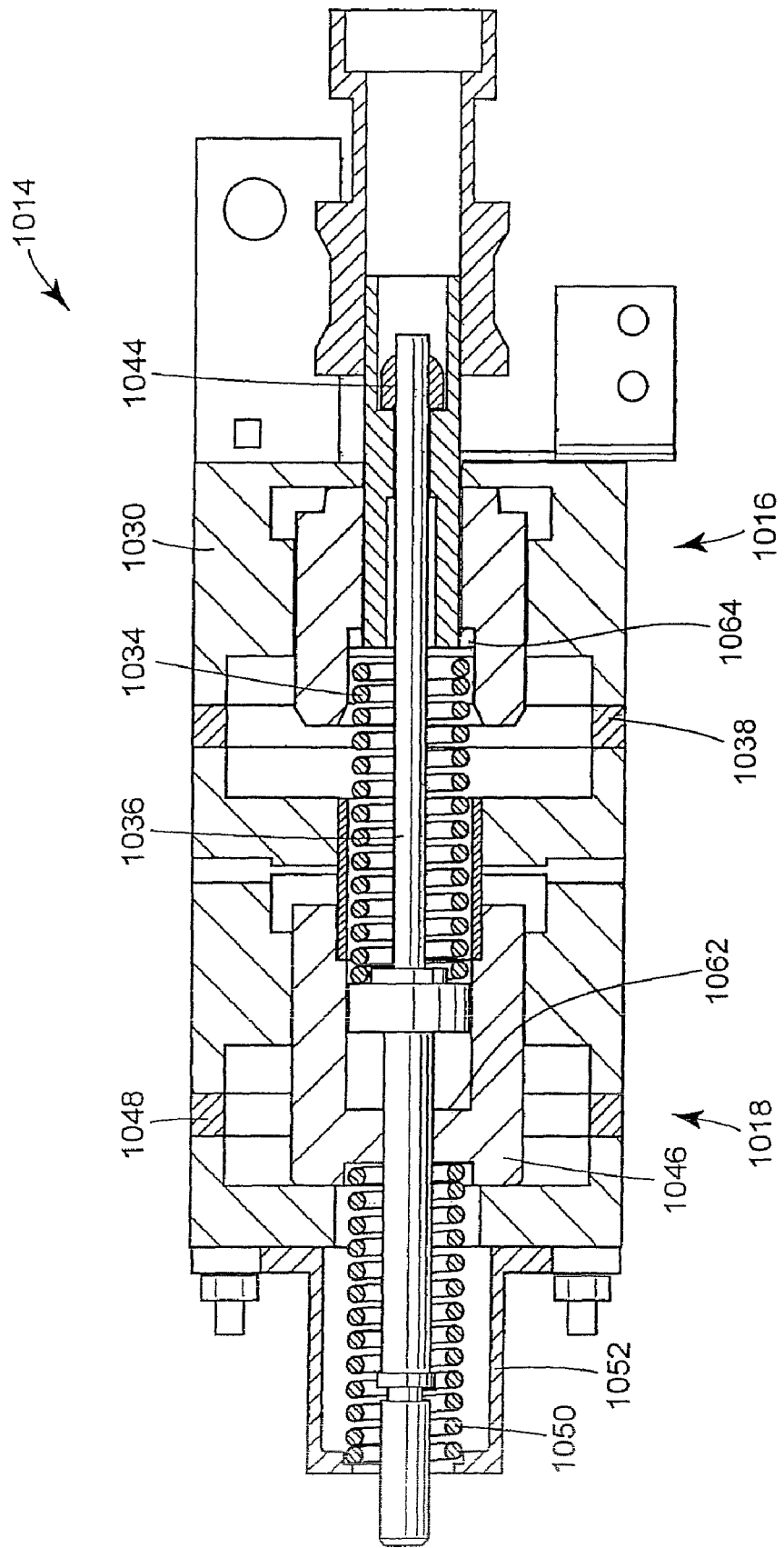
FIG. 10 is enlarged view of an alternate embodiment of an actuator portion suitable for use in the circuit testing closer illustrated in FIG. 8.

FIG. 10 illustrates an alternative embodiment of an actuator assembly 1014 operable within the circuit testing closer 800. The actuator assembly 1014 includes a main actuator 1016 and a secondary actuator 1018. The actuator assembly 1014 operates under the same principles as the actuator assembly 814 that is to provide a coordinated closing of the contacts 804 and 806 relative to the voltage wave and a nearly instantaneous opening of the contacts 804 and 806 after generation of a test current loop and substantially in time with the current loop zero. In this concept, following a fault, the main actuator 1014 is held open wherein the main actuator plunger 1030 is held by a main actuator plunger hold open magnet 1038. The secondary actuator 1018 is in the closed position with the secondary actuator plunger 1046 held closed by the secondary actuator plunger hold close magnet 1048. The main actuator 1016 is pulsed to drive the main actuator plunger 1030 toward the closed position, moving the main contact ferrule 1036 and the moveable contact 806 toward the closed position. The secondary actuator coil 1058 is pulsed to unlatch the secondary actuator plunger 1046. The timing of the pulsing of the secondary actuator coil 1058 is such that the impact of the secondary actuator plunger 1046 with the main actuator 1016 is nearly instantaneous with the contact making of the contacts 804 and 806, as described above for the actuator 814. The actuator 1014 is different, however, in that the secondary actuator is formed with a recess 1060 within which the main contact ferrule 1036 slides longitudinally and a contact surface 1062. The main contact ferrule is further formed with a shoulder 1064. The secondary actuator plunger 1046 directly impacts the main contact ferrule 1036 with the contact surface 1062 engaging the shoulder 1064. This impact drives the contacts 804 and 806 open. But, at impact the main actuator plunger 1030 is still moving toward the closed position. Shortly after the initial impact by the secondary actuator plunger 1046 on the ferrule 1036, the secondary actuator plunger 1046 impacts the main actuator plunger 1030 driving it back towards the open position. The combination of the two impacts drive the main actuator plunger 1030, the main contact ferrule 1036 and the moving contract 806 toward the open position creating a sufficient gap to extinguish the arc nearly instantaneously with the current loop zero. With the main actuator plunger 1030 and main contact ferrule 1036 held in the open position, the secondary actuator plunger 1046 may be pulsed back to its normally closed position.

Consistent contact closing and opening is necessary to ensure a sufficient gap is created between the contacts 804 and 806 to extinguish the test current loop arc. The test current loop, even at fault, is small in magnitude and is also small in duration, particularly as compared to the full fault current. Thus, a smaller gap than is necessary to extinguish a full fault current arc will satisfactorily extinguish the test current loop arc, for example about 3-4 mm maybe sufficient. However, if contact make occurs even a few milliseconds too early or too late, the induced minor loop will be either too small to achieve a sufficient open gap for clearing, or too large in magnitude thus subjecting the upstream power system to significant fault currents. The hold-open magnet arrangement of the circuit testing closer 800 is employed as an opening latching mechanism. The hold-open magnetic arrangement provides a consistent opening force over the course of the life of the device. In addition, the closer 800 permits the main actuator plunger to travel closed unimpeded until contact is made. Employing a hold-open magnetic arrangement as shown for the closer 800 allows for a design where contact make times within a tolerance of +/−1 ms can be achieved. Test current loops induced in this contact make range are all small enough in magnitude to achieve the goal of the circuit test, but large enough in duration to allow adequate time for contact separation to occur.

Figure 11:
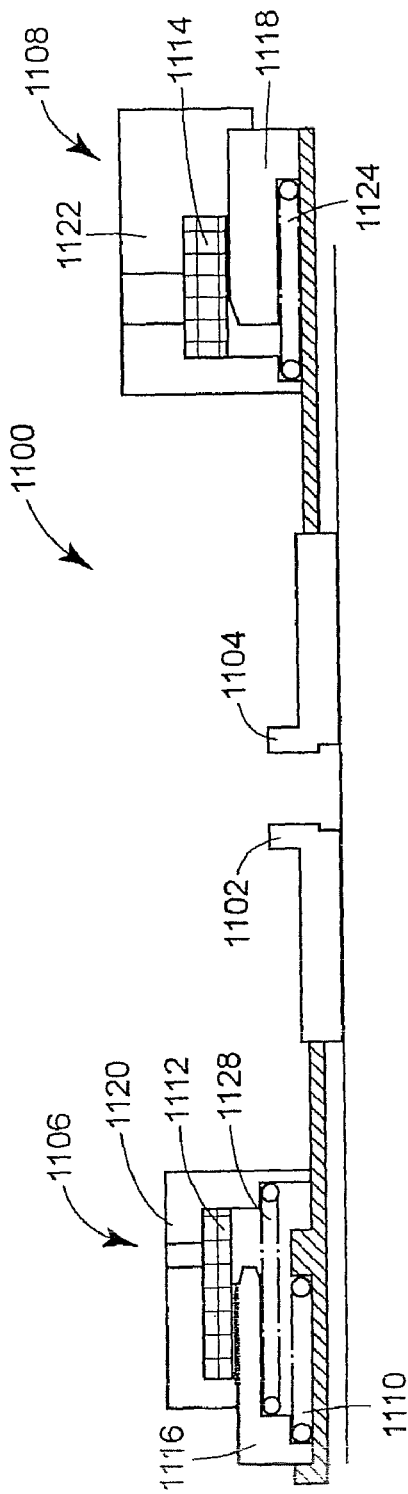
FIG. 11 is a schematic cross-section view of a circuit testing closer adapted to provide a test pulse in accordance with another of the herein described embodiments.
Figure 12:
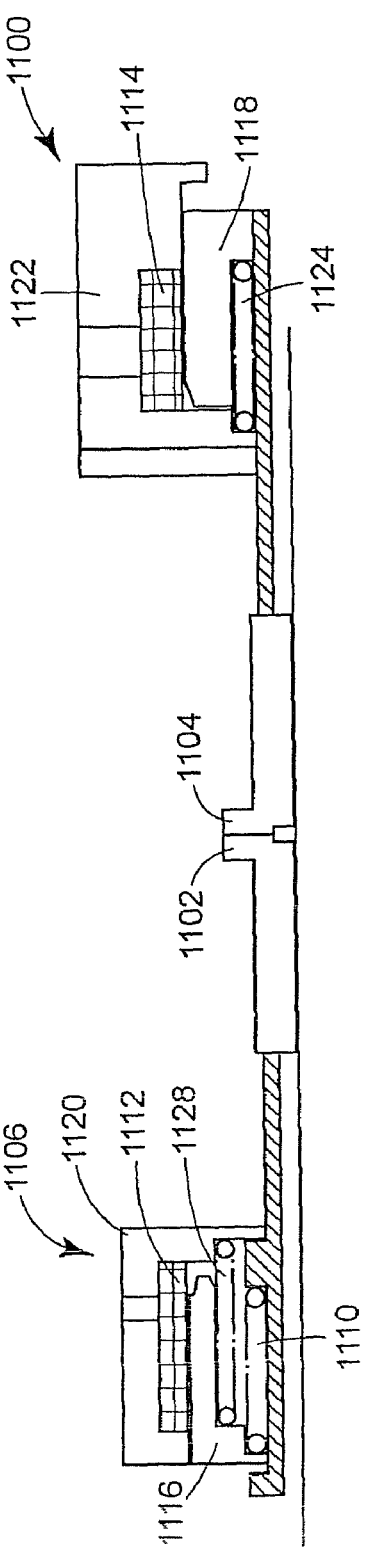
FIG. 12 is a schematic cross-section view of the circuit testing closer illustrated in FIG. 11 in an actuated state.

FIGS. 11 and 12 illustrate a circuit testing closer 1100. The circuit testing closer includes a main contact 1102 and an auxiliary contact 1104, each being coupled to actuators main actuator 1106 and auxiliary actuator 1108, respectively. As shown in FIG. 11, both contacts 1102 and 1104 are in a full open position. The contacts 1102 and 1104 may be brought into contact for normal operation, FIG. 12, wherein a biasing spring 1110 in the main contact actuator 1106 provides a contact force. The biasing spring 1110 also provides compliance that minimizes impact forces being transmitted into the main actuator 1106.

Each of the main actuator 1106 and the auxiliary actuator 1108 includes a electromagnetic coil 1112 and 1114, for driving an armature assembly 1116 and 1118 relative to a base 1120 and 1122, respectively. Movement of the respective armature assemblies 116 and 118 causes corresponding movement of the contacts 1102 and 1104 toward or away from each other. As such, the contacts 1102 and 1104 may be made to cause a brief contact in order to generate a test current loop.

After a fault, both contacts 1102 and 1104 are in their respective fully open positions. To generate a test current loop, the auxiliary actuator is energized to its closed position, thus reducing the gap 1124 between the main contact 1102 and the auxiliary contact 1104 by half. The main actuator 1106 is energized to cause the main contact 1102 to close and make with the auxiliary contact 1104. The timing of the main actuator 1106 is such that the main contact 1102 and auxiliary contact make just before a voltage zero on the voltage wave. The main contact 1102 impacts the auxiliary contact 1104. The impact dislodges the auxiliary armature assembly 1118, and opens the auxiliary contact 1104 sufficiently that an opening spring 1124 in the auxiliary actuator 1108 fully opens the auxiliary contact 1104, within about 2 ms. The auxiliary actuator 1108 may further be pulsed to the open position just prior to contact to reduce the holding force so that more of the impact energy of the contracts 1102 and 1104 coming together may be available for accelerating the auxiliary 1104 contact away from the main contact 1102.

After impact, the main contact 1102 continues to travel to its fully closed position. The auxiliary contact 1104 is now at it fully open position. The gap is not a full open gap, but is sufficient to extinguish the test current loop arc. For lockout purposes, the main actuator 1106 retracts the main contact to its full open position with the assistance of an opening spring 1128.

Figure 13:
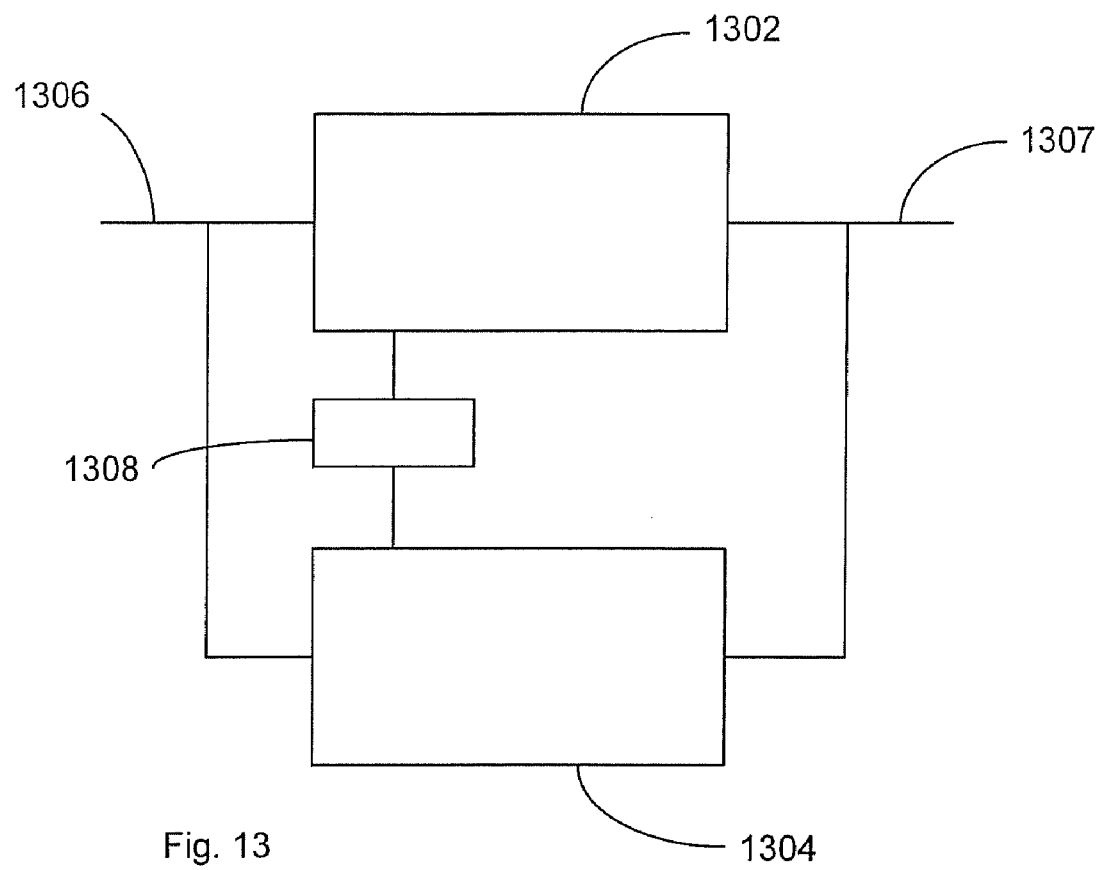
FIG. 13 is a block diagram of a circuit testing closer in accordance with another of the herein described embodiments.
Figure 14:
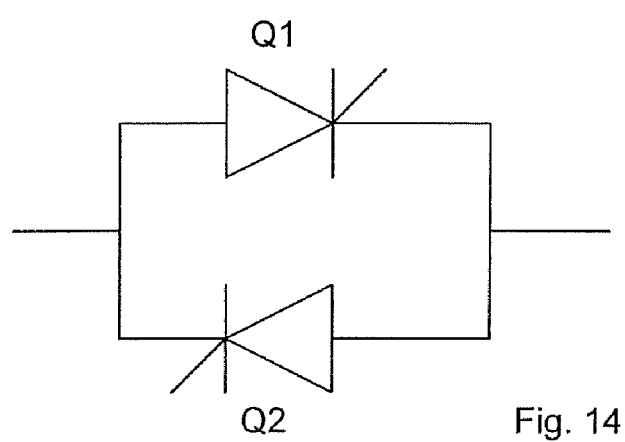
FIG. 14 is a schematic representation of one embodiment of a portion of the circuit testing closer of FIG. 13.

Referring to FIG. 13, a closer 1300 includes an electromechanical switching device 1302, for example, a vacuum interrupter assembly and a current pulse generator 1304 coupled between a supply side 1306 and a load side 1307 of a power distribution system 1306. The switching device 1302 is operable to carry relative high current loads, upon fault detection to isolate the fault, and upon clearing of the fault, to reclose the line segment restoring service. The current pulse generator 1304 may be a pair of silicon controlled rectifiers (SCRs) or a triac (FIG. 14). After fault detection and isolation, to test the circuit, i.e., to generate a current pulse, either of the pair of SCRs, Q1 or Q2, is turned on at between 90 and 150 degrees on the power-frequency voltage wave. The gate signal can be removed at any point thereafter but before the first power-frequency current zero. Delaying the removal of the gate signal may advantageously prevent unwanted early circuit clearing which could fool detection algorithms. When the resulting minor loop of current goes through zero, the ungated SCR turns off and the resulting minor loop of current is analyzed to determine if the circuit is faulted or not.

In the embodiment illustrated in FIG. 13, the current pulse generator 1304 does not carry continuous current. Control of the vacuum interrupter 1302 and the current pulse generator 1304 may be provided by the controller 1308, or by other suitable control means. However, SCRs may carry continuous current, switch load, and interrupt faults. Thus, for certain applications, and particularly at utilization voltages such as 120V-600V, it would be possible to eliminate the switching device 1302 and utilize only the current pulse generator 1304 to provide current carrying functionality, load switching, fault interruption and test current pulse generation. While FIG. 14 illustrates a single SCR pair, a series string and/or series/parallel strings may be used.

A single SCR may be used in place of the triac arrangement depicted in FIG. 14. In such an arrangement, the switch device 1302 is used for all normal switching, and the SCR is not gated on. The switching device 1302 may be used for fault interrupting in which case during fault interrupting the SCR is not gated on. If the SCR is used for fault interrupting, the opening operation should to be timed so that the switching device 1302 opens just after a current zero on a positive going current. Then the SCR would be gated on and current would transfer into the SCR. The contacts of switching device 1302 would have to move fast enough to withstand the transient recovery voltage when the SCR interrupts the current at the next power frequency current zero. For circuit testing, the SCR is turned on and off as described above, except that with only one SCR only one polarity can be checked.

When used in combination with an electromechanical switching device such as a vacuum interrupter driven by a conventional magnetic actuator, solid state switching devices, such as SCRs, may provide precise point-on-wave closing and interruption at a current zero without mechanisms. An embodiment that only uses SCRs to conduct in one direction may prove more economical and be viable at medium or lower voltages such as at or below 4 kV. In addition, solid state switching components allow many more circuit tests before closing or locking out than an electromechanical switching device because there is no concern about mechanical wear.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A method of reclosing a power distribution circuit following a fault opening of the circuit, the method comprising:
    generating within the circuit a test signal by momentarily closing the circuit;
    determining at least one dynamic threshold based upon a characteristic of a fault protection device associated with the fault opening of the circuit;
    determining from the test signal and the dynamic threshold existence of the fault; and
    reclosing the circuit in the absence of the fault.

2. The method of claim 1, wherein generating a test signal comprises generating a test current loop in the circuit.

3. The method of claim 1, wherein the dynamic threshold is based upon a multiple of the characteristic.

4. The method of claim 3, wherein the multiple is 80% to 150% of the characteristic.

5. The method of claim 1, wherein determining a dynamic threshold comprises limiting the dynamic threshold.

6. The method of claim 1, comprising repeating the method for a predetermined number of tests and wherein determining at least one dynamic threshold comprises determining a dynamic threshold for each of the predetermined number of tests.

7. The method of claim 6, wherein a dynamic threshold associated with an initial test of the predetermined number of tests is biased toward determining a fault and the dynamic threshold associated with a last test of the predetermined number of tests is biased toward not determining a fault.

8. The method of claim 7, wherein dynamic thresholds associated with tests of the predetermined number of tests between the initial test and the last test are determined by linear interpolation.

9. The method of claim 1, wherein determining the dynamic threshold comprises determining the dynamic threshold based upon a pre-fault load current.

10. The method of claim 1, wherein determining the dynamic threshold comprises determining the dynamic threshold based upon a directionality factor or a cold load factor.

11. A circuit testing recloser comprising:
a first electrical contact and a second electrical contact, the first electrical contact being moveable relative to the second electrical contact to make and unmake contact, the first electrical contact and the second electrical contact adapted to be coupled to a first electrical conductor and a second electrical conductor of a power distribution system;
an actuator assembly coupled to the first contact to provide relative movement of the first contact and the second contact the actuator being operable to move the first contact from the second position to the first position to generate a test current loop in the power distribution system;
a controller coupled receive the test current loop and to determine the existence of a fault based upon a characteristic of the test current loop and a dynamic threshold, wherein the dynamic threshold comprises a plurality of thresholds one each being associated with a predetermined number of tests.

12. The circuit testing recloser of claim 11, wherein the dynamic threshold is based upon a characteristic of the circuit testing recloser.

13. The circuit testing recloser of claim 12, wherein the threshold is based upon a multiple of the characteristic.

14. The circuit testing recloser of claim 13, wherein the multiple is 80% to 150% of the characteristic.

15. The circuit testing recloser of claim 11, wherein the threshold comprises a minimum threshold.

16. The circuit testing recloser of claim 11, wherein a threshold associated with an initial test of the predetermined number of tests is biased toward determining a fault and the threshold associated with a last test of the predetermined number of tests is biased toward not determining a fault.

17. The circuit testing recloser of claim 16, wherein thresholds associated with tests of the predetermined number of tests between the initial test and the last test are determined by linear interpolation.

18. The method of claim 11, wherein the dynamic threshold comprises is based upon a pre-fault load current, directionality factor or a cold load factor.

* * * * *